United States Patent [19]

Mechalas

[11] Patent Number: 5,069,415

[45] Date of Patent: Dec. 3, 1991

[54] ADJUSTABLE MOUNTING ASSEMBLY FOR ELECTRIC MOTORS

[76] Inventor: Emmanuel Mechalas, 123 N. Hazel, Danville, Ill. 61832

[21] Appl. No.: 556,998

[22] Filed: Jul. 25, 1990

[51] Int. Cl.⁵ .............................................. F16F 15/04
[52] U.S. Cl. .................................... 248/674; 248/604
[58] Field of Search .............. 248/674, 675, 603, 604, 248/649, 27.1, 188.2, 662

[56] References Cited

U.S. PATENT DOCUMENTS

| | | | |
|---|---|---|---|
| 3,089,639 | 5/1963 | Hannibal | 248/604 |
| 3,790,114 | 2/1974 | Italiano et al. | 248/675 |
| 3,903,443 | 9/1975 | Carlson | 248/662 X |
| 4,155,528 | 5/1979 | Dawson | 248/674 |
| 4,253,634 | 3/1981 | Daniels | 248/604 |
| 4,323,217 | 4/1982 | Dochterman | 248/604 |
| 4,572,472 | 2/1986 | Eder | 248/603 X |
| 4,759,526 | 7/1988 | Crawford et al. | 248/674 X |
| 4,849,667 | 7/1989 | Morrill | 248/674 X |
| 4,920,696 | 5/1990 | Mawby et al. | 248/674 X |

Primary Examiner—Carl D. Friedman
Assistant Examiner—Daniel Hulseberg
Attorney, Agent, or Firm—Neal J. Mosely

[57] ABSTRACT

An adjustable mounting assembly for mounting electric motors and the like onto a support surface has a clamp in the form of a circular band with a pair of circular wire hoops for encircling the exterior of the article, e.g., a motor, to be mounted and a plurality of mounting brackets each having a leg portion for abutting the surface of the article to be mounted and a base portion disposed at a right angle to the leg portion with an aperture for mounting the article onto the support surface. Each bracket leg portion has a plurality of longitudinally spaced openings and tabs for receiving the hoops of the band at selective positions along its length. Each bracket is adjustably connected to the band for circumferential positioning at selective locations on the band to axially align the apertures of the upstanding base portions with an existing mounting arrangement of the support surface. Each bracket is also adjustably connected to the band for independent longitudinal positioning relative to the band and to the article to be mounted and relative to one another for placing the upstanding base portion of each bracket adjacent a portion of the support surface whereby the article to be mounted may be properly positioned and mounted onto a support where the mounting arrangements are uneven or not in the same plane.

10 Claims, 1 Drawing Sheet

ADJUSTABLE MOUNTING ASSEMBLY FOR ELECTRIC MOTORS

BACKGROUND OF THE INVENTION

1. Field of the Invention

This invention relates generally to motor mounting arrangements, and more particularly to an adjustable mounting assembly having mounting brackets which are circumferentially and axially adjustable relative to the motor axis to mount the motor to a support surface which may be non-planar and have non-symmetrically spaced mounting holes or studs.

2. Brief Description of the Prior Art

Electric motors are most often mounted in a particular position relative to a driven device. It is sometimes desirable or necessary to use a replacement motor where the mounting arrangement or circumferential spacing of the securing bolts of the existing support structure is different from the original motor, or wherein the support structure mounting surfaces are uneven or are not in the same plane. It is therefore desirable to provide an adjustable mounting assembly having mounting brackets which are circumferentially and axially adjustable relative to the motor axis to mount the motor to a support surface which may be non-planar and have non-symmetrically spaced mounting holes or studs.

A common mounting system, referred to as a "belly band" comprises a circular band in the form of flat straps or a pair of wire hoops encircles the motor frame and has elongated mounting rods or arms connected at one end to the band and their other end extending radially outward and configured to be bolted to a support structure. This system provides no circumferential or axial adjustment of the mounting rods relative to one another.

It is also known to provide a plurality of L-shaped bracket members which are connected to the circular "belly band" at selective circumferential positions and have a bolt hole in their upstanding leg for bolting the assembly to a support structure. This system may provide circumferential adjustment of the spacing of the L-shaped brackets, but no axial adjustment of the mounting brackets relative to one another.

There are several patents on various other mounting systems and brackets.

The design patents of Carver, U.S. Pat. No. D173,720 and Morrison, U.S. Pat. No. D195,886 show mounting bracket shapes which are for a bed spring support and a wall mounted heater or air conditioner unit respectively, and would not be suitable for use as a motor mount.

Levine, U.S. Pat. No. 4,260,125 discloses several flat plate motor mounting brackets which are slotted for mounting a motor to a unit having mounting holes of different spacing.

Levine U.S. Pat. No. 4,033,531 discloses mounting assembly for mounting electric motors and the like comprising a clamp including a strap embracing the article to be mounted and support brackets having apertures and slots for receiving the strap and supporting the article above the support surface. Each bracket has an upstanding leg and a base disposed at a right angle thereto. The leg member has an elongate aperture perpendicular to the base and slot perpendicular to the aperture with the strap being slidably disposed in one of the aperture and slot of each bracket.

Carlson, U.S. Pat. No. 3,903,443 discloses an electric motor including a shell having a plurality of circumferentially spaced, axially extending slots and a lug is associated with at least some of the slots and has an opening therein. A fastener having an enlarged head is received through the slots in the shell and lug opening and receives a nut to secure the lug to the shell.

Crawford, U.S. Pat. No. 4,759,526 discloses an electric motor mounting assembly having a plurality of elongated circumferentially spaced adapters having one end bolted to the cylindrical frame of the motor. A band in the form of a pair of wire hoops encircles the frame and one end of the adapters and has elongated mounting rods or arms connected at one end to the band and their other end extending radially outward and configured to be bolted to an external structure. The band is clamped around the motor and adapters and when tightened, prevents movement of the motor with respect to the band. In one embodiment, the adapter is provided with semi-circular cutouts to receive the hoops of the band whereby the axial position of the motor can be adjusted by the distance of the cutouts. This system allows axial adjustment of the motor relative to the mounting surface, but provides no circumferential or axial adjustment of the mounting rods relative to one another.

The present invention is distinguished over the prior art in general, and these patents in particular by an adjustable mounting assembly for mounting electric motors and the like onto a support surface has a clamp in the form of a circular band with a pair of circular wire hoops for encircling the exterior of the article, e.g., a motor, to be mounted and a plurality of mounting brackets each having a leg portion for abutting the surface of the article to be mounted and a base portion disposed at a right angle to the leg portion with an aperture for mounting the article onto the support surface. Each bracket leg portion has a plurality of longitudinally spaced openings and tabs for receiving the hoops of the band at selective positions along its length. Each bracket is adjustably connected to the band for circumferential positioning at selective locations on the band to axially align the apertures of the upstanding base portions with an existing mounting arrangement of the support surface. Each bracket is also adjustably connected to the band for independent longitudinal positioning relative to the band and to the article to be mounted and relative to one another for placing the upstanding base portion of each bracket adjacent a portion of the support surface whereby the article to be mounted may be properly positioned and mounted onto a support where the mounting arrangements are uneven or not in the same plane.

The present adjustable motor mounting assembly may be easily and quickly installed on a new or replacement motor allowing the motor to be securely mounted onto a support surface wherein the circumferential spacing of the bolting arrangement of the existing support structure is different from the original motor, or wherein the support structure mounting surfaces are uneven or are not in the same plane, and also allow the brackets to be axially adjustable relative to the motor axis to position the motor relative to a driven device.

SUMMARY OF THE INVENTION

It is therefore an object of the present invention to provide an adjustable mounting assembly for mounting electric motors and the like into a support surface.

It is another object of this invention to provide an adjustable mounting assembly which has a clamp including a band to encircle the exterior of the article, e.g. motor, to be mounted and a plurality of mounting brackets each adjustably connected to the band and having an apertured base portion for mounting the article onto a support surface.

Another object of this invention is to provide an adjustable mounting assembly including a clamp having a band to encircle the exterior of the article, e.g. motor, to be mounted and a plurality of mounting brackets each having a leg portion adjustably connected to the band for circumferential positioning at selective locations on the band to axially align the apertures of the base portions with an existing mounting arrangement of the support surface.

Another object of this invention is to provide an adjustable mounting assembly including a clamp having a band to encircle the exterior of the article to be mounted and a plurality of mounting brackets each having a leg portion adjustably connected to the band for independent longitudinal positioning relative to the band and to the article to be mounted and relative to one another for placing the upstanding base portion of each bracket adjacent a portion of the support surface whereby the article to be mounted may be properly positioned and mounted onto a support wherein all the mounting arrangements are uneven or not in the same plane.

A further object of this invention is to provide an adjustable motor mounting assembly which may be easily and quickly installed on a new or replacement motor allowing the motor to be securely mounted onto a support surface wherein the circumferential spacing of the bolting arrangement of the existing support structure is different from the original motor, or wherein the support structure mounting surfaces are uneven or are not in the same plane, and also allow the brackets to be axially adjustable relative to the motor axis to position the motor relative to a driven device.

A still further object of this invention is to provide an adjustable motor mounting assembly which is simple in design and construction, economical to manufacture, and rugged and durable in use.

Other objects of the invention will become apparent from time to time throughout the specification and claims as hereinafter related.

The above noted objects and other objects of the invention are accomplished by an adjustable mounting assembly for mounting electric motors and the like onto a support surface having a clamp in the form of a circular band with a pair of circular wire hoops for encircling the exterior of the article, e.g., a motor, to be mounted and a plurality of mounting brackets each having a leg portion for abutting the surface of the article to be mounted and a base portion disposed at a right angle to the leg portion with an aperture for mounting the article onto the support surface. Each bracket leg portion has a plurality of longitudinally spaced openings and tabs for receiving the hoops of the band at selective positions along its length. Each bracket is adjustably connected to the band for circumferential positioning at selective locations on the band to axially align the apertures of the upstanding base portions with an existing mounting arrangement of the support surface. Each bracket is also adjustably connected to the band for independent longitudinal positioning relative to the band and to the article to be mounted and relative to one another for placing the upstanding base portion of each bracket adjacent a portion of the support surface whereby the article to be mounted may be properly positioned and mounted onto a support where the mounting arrangements are uneven or not in the same plane.

The present adjustable motor mounting assembly may be easily and quickly installed on a new or replacement motor allowing the motor to be securely mounted onto a support surface wherein the circumferential spacing of the bolting arrangement of the existing support structure is different from the original motor, or wherein the support structure mounting surfaces are uneven or are not in the same plane, and also allow the brackets to be axially adjustable relative to the motor axis to position the motor relative to a driven device.

DESCRIPTION OF THE PREFERRED EMBODIMENT

Figure 1:
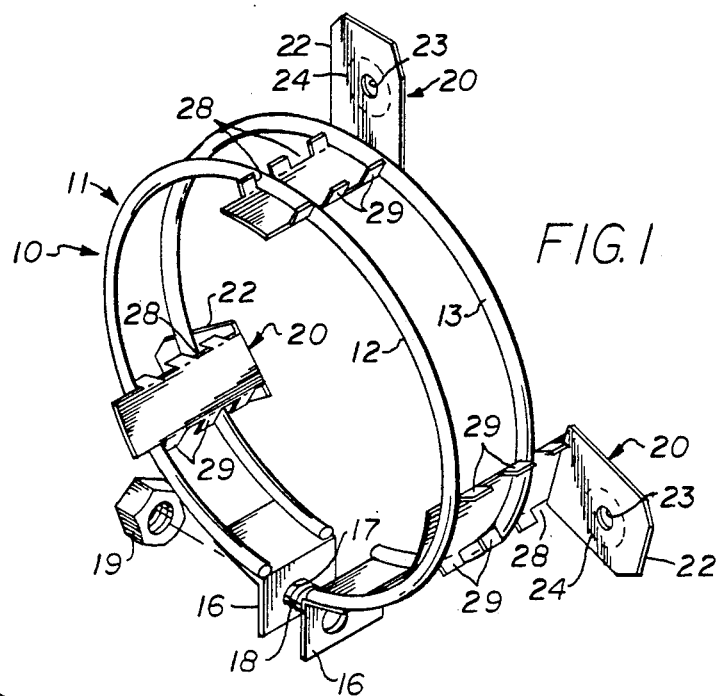
FIG. 1 is an isometric view of a preferred adjustable mounting assembly in accordance with the present invention.

Referring to the drawings by numerals of reference, there is shown in FIGS. 1 - 5, a preferred adjustable mounting assembly 10. The assembly 10 comprises a circular band 11 commonly referred to as a "belly band" in the form of a pair of circular wire hoops 12 and 13 which encircle the outer housing 14 of the motor 15. While the illustrated band is shown as a pair of circular wire hoops, it should be understood that the band could be formed of circular flat straps. The free ends of the band 11 are secured to a pair of flat opposed L-shaped clamping members 16 which have a hole 17 in their upstanding leg portions. A headed bolt 18 received through the holes 17 receives a nut 19 whereby the band may be tightened to clamp the band around the motor housing 14.

Figures 2, 3:
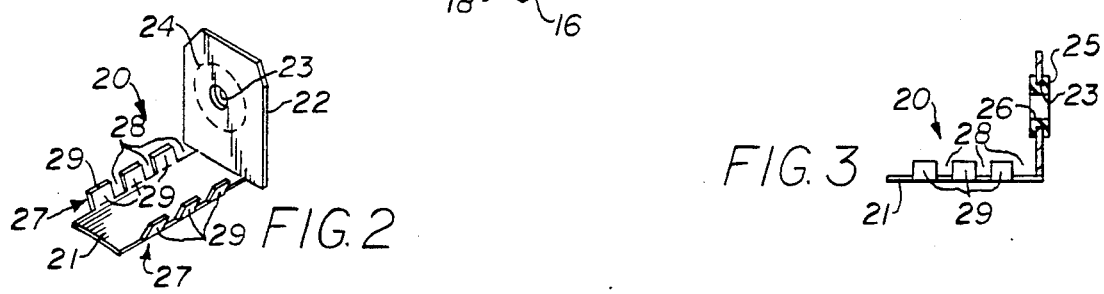
FIG. 2 is an isometric view of a preferred adjustable mounting bracket for use in the mounting assembly of FIG. 1.
FIG. 3 is a side elevation of the mounting bracket of FIG. 2, shown in partial cross section.
Figure 4:
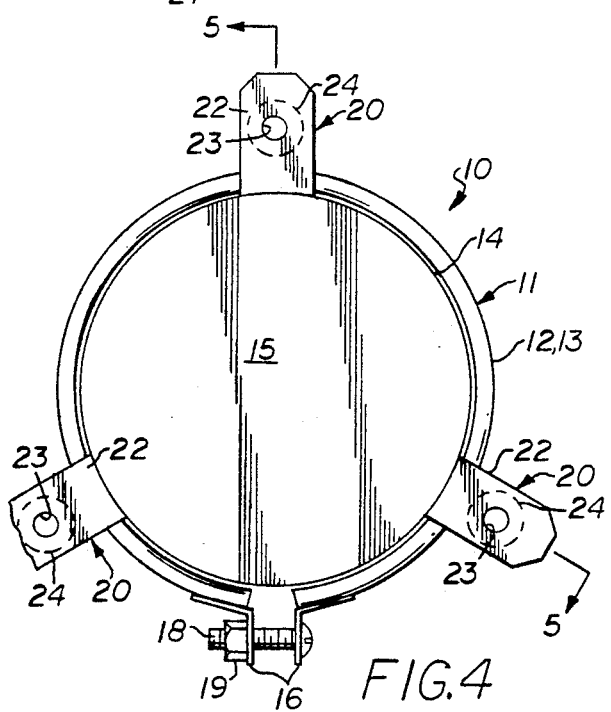
FIG. 4 is an end elevation view a motor having the mounting installed thereon.

A plurality of L-shaped bracket members 20 are positioned on the band 11 at circumferentially spaced locations. As best seen in FIGS. 2 and 3, each bracket member 20 has a base portion 22 and an upstanding leg portion 21. The leg portion 21 is slightly curved in cross section to substantially conform to the curvature of the motor housing 14 and the base portion 22 is bent at a right angle thereto. Base portion 22 has an aperture 23 which receives a mounting bolt (not shown) for mounting the assembly to a support surface. As indicated in dotted line, the bolt aperture 23 may be surrounded by a partially cut-out portion or knock-out 24 which can be forced out when a larger aperture is needed.

Alternatively, as seen in FIG. 3, a bushing 25 of resilient material having a central aperture 26 may also be installed in the aperture 23 whereby the mounting bolt may be received through the bushing or the bushing may be removed when a larger aperture is needed.

Referring again to FIG. 2, the longitudinal side edges 27 of the leg portion 21 of the brackets 20 are bent upward and slightly outward with respect to the curved portion thereof and have square cut-out portions 28 spaced along their length to form a plurality of longitudinally spaced, upward and outwardly extending tabs 29.

The tabs 29 and cut-outs 28 are sized and spaced to receive the circular wire hoops 12 and 13 of the band 11. Each of the brackets 20 may be adjusted circumferentially relative to the band 11 and to one another to fit the circumferential spacing of the mounting holes in the bracket support surface to which the motor is to be mounted.

If the mounting holes on the mounting surface are in the same plane, the plurality of cut-outs 28 allow the brackets 20 to be adjusted relative to the longitudinal axis of the motor to position the motor relative to a driven device by selecting the corresponding pair of cut-outs to receive the wire hoops 12 and 13.

Figure 5:
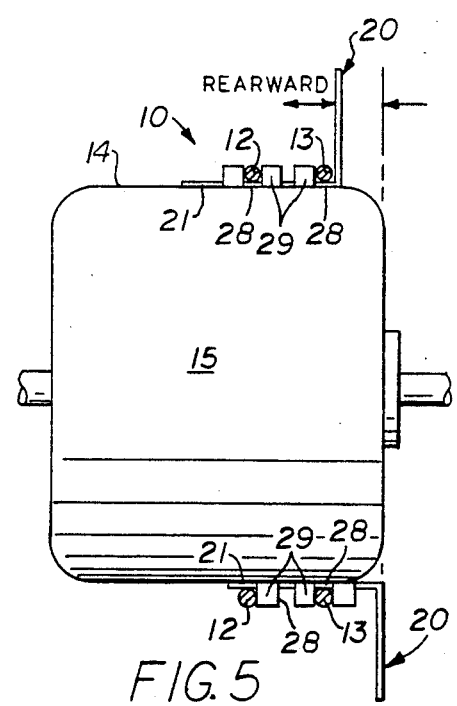
FIG. 5 is a side elevation view of a motor having the mounting assembly installed thereon.

As seen in FIG. 5, by providing a plurality of longitudinally spaced cut-outs 28, the wire hoops 12 and 13 of the band 11 may also be installed in a forward pair of cut-outs on certain ones of the brackets 20 and in a rearward pair of cutouts in other ones of the brackets. Thus, the brackets 20 may be adjusted relative to the end of the motor along the longitudinal axis of the motor and also relative to one another to mount the motor to a support surface wherein the mounting holes may not all be in the same plane.

Therefore, it can be seen that the utilitarian features of the present adjustable motor mounting assembly allow it to be used in installing a new or replacement motor onto a support surface wherein the circumferential spacing of the bolting arrangement of the existing support structure is different from the original motor, or where the support structure mounting surfaces are uneven or are not in the same plane, and also allow the brackets to be axially adjustable relative to the motor axis to position the motor relative to a driven device.

OPERATION

To use the present mounting assembly, the installer measures the desired longitudinal distance of the location of the motor relative to the support surface to which it is to be mounted and determines the distance from the end of the motor to the upstanding legs of the brackets for placing the motor in the proper location relative to the device to be driven. If the mounting holes of the support surface all lie in the same plane, the same pair of cut-outs in each bracket will be used. If the mounting holes of the support surface are not all in the same plane, then the appropriate pair of cut-outs in each bracket is determined to place each upstanding leg o the brackets at the proper distance relative to the end of the motor. In other words, the wire hoops 12 and 13 of the band 11 may be installed in a forward pair of cut-outs on certain ones of the brackets 20 and in a rearward pair of cut-outs in other ones of the brackets.

The installer determines the number of brackets to be used to correspond to the number of mounting holes to be used. The size of the mounting bolts are determined, and if a larger aperture through the upstanding leg of the bracket is needed, the knock-out portion 24 may be forced out, or the bushing 25 may be removed, otherwise the installer may utilize the existing aperture.

The wire hoops 12 and 13 of the band 11 are placed into the proper cut-outs 27 of the leg portion 21 of each bracket 20. The band 11 with the brackets 20 attached is placed over the motor housing 14 to encircle the outer housing 14, a bolt 18 is installed through the clamping members 16, a nut 19 is installed on the bolt and snugged down sufficient to hold the band 11 in place but loose enough to move the brackets circumferentially.

The motor 15 with the band and brackets installed is placed into the desired position and each of the brackets 20 may be adjusted circumferentially relative to the band 11 and to one another to fit the circumferential spacing of the mounting holes in the support surface to which the motor is to be mounted whereby the bracket apertures 23 are axially aligned with the mounting holes. Mounting bolts are then installed through the bracket apertures and into the support surface.

The nut 19 is tightened to clamp the band around the motor housing 14. When the band is tightly clamped around the motor, the wire hoops 12 and 13 are firmly secured within the cut-outs 28 and between the tabs 29 to prevent movement of the mounting brackets relative to the motor.

Thus, the adjustable motor mounting assembly may be easily and quickly installed on a new or replacement motor allowing the motor to be securely mounted onto a support surface wherein the circumferential spacing of the bolting arrangement of the existing support structure is different from the original motor, or wherein the support structure mounting surfaces are uneven or are not in the same plane, and also allow the brackets to be axially adjustable relative to the motor axis to position the motor relative to a driven device.

While this invention has been described fully and completely with special emphasis upon a preferred embodiment, it should be understood that within the scope of the appended claims the invention may be practiced otherwise than as specifically described herein.

I claim:

1. A mounting assembly for mounting electric motors and the like onto a support surface comprising; clamp means including a band for embracing the article to be mounted, a plurality of independently adjustable mounting brackets each having a leg portion for abutting the surface of the article to be mounted and a base portion disposed at a right angle thereto and having an aperture for mounting the bracket onto the support surface for supporting the article thereon, each said bracket leg portion having a plurality of longitudinally spaced openings for receiving the band of said clamp means in selective positions along its length, and each said bracket being removably and adjustably connected with said band for circumferential positioning at selective locations on said band to axially align the apertures of said base portions with an existing mounting arrangement of the support surface, and each said bracket being adjustably connected with said band for longitudinal positioning relative to said band and to the article to be mounted for placing the article relative to the support surface whether the support surface is planar or non-planar.

2. A mounting assembly according to claim 1 wherein said band comprises a pair of wires encircling the exterior of the article to be mounted and having first and second ends secured to each other by clamping members which receive fastener means for clamping said band around the article to be mounted.

3. A mounting assembly according to claim 2 wherein said clamping members comprise a pair of L-shaped members having one leg portion secured to adjacent first ends of said wires and another leg portion secured to adjacent second ends of said wires and an upstanding leg portion of each L-shaped member having a hole therethrough to receive a bolt with a nut whereby said band may be tightened to clamp the band around the article to be mounted.

4. A mounting assembly according to claim 1 wherein
said bracket leg portion being slightly curved in transverse cross section to substantially conform to the surface of the article to be mounted and said base portion being bent at a right angle with respect to said leg portion, and
said base portion having an aperture for receiving a mounting bolt for mounting the bracket to the support surface.

5. A mounting assembly according to claim 4 in which
said band comprises a pair of wires encircling the exterior of the article to be mounted and having first and second ends of each wire secured to each other by clamping members which receive fastener means for clamping said band around the article to be mounted, and
each said bracket leg portion having longitudinal side edges bent upward and slightly outward with respect to the curved portion thereof and cut-out portions spaced along their length to form a plurality of longitudinally spaced, upward and outwardly extending tabs,
said tabs and cut-out portions being sized and spaced to receive said wires to adjustably connect each said bracket to said band, whereby
each of said brackets may be adjusted relative to said band along its circumference and relative to one another to fit the circumferential spacing of the mounting arrangement of the support surface to which the article is to be mounted.

6. A mounting assembly according to claim 5 in which said tabs and cut-out portions being sized and spaced to receive said wires to adjustably connect each said bracket to said band, whereby
said wires may be received to selective pairs of cut-out portions on certain ones of said brackets such that said brackets may be adjustably positioned relative to the article to be mounted and relative to one another for mounting the article onto a support surface wherein all the mounting arrangements may not be in the same plane.

7. A mounting assembly for attachment to a circular motor mounting clamp of the type having a band for embracing the article to be mounted, comprising:
a plurality of independently adjustable mounting brackets each comprising a generally L-shaped member having a leg portion for abutting the surface of the article to be mounted and a base portion disposed at a right angle thereto and having an aperture for mounting the bracket onto the support surface for supporting the article thereon,
said leg portion of said L-shaped member having a plurality of longitudinally spaced openings for receiving the band of said clamp in selective positions along its length, and
said L-shaped member being removably and adjustably connected by said spaced openings with said band for circumferential positioning at selective locations on said band to axially align the apertures of said base portion of said L-shaped member with an existing mounting arrangement of the support surface, and
said L-shaped member being adjustably connected by said longitudinally spaced openings with said band for longitudinal positioning relative to said band and to the article to be mounted for placing the article relative to the support surface whether the support surface is planar or non-planar.

8. A mounting assembly according to claim 7 wherein said L-shaped member being adjustably connected by said spaced openings with said band for independent longitudinal positioning of said mounting bracket relative to another mounting bracket for placing the base portion of L-shaped member adjacent to a portion of the support surface whereby the article to be mounted may be properly positioned and mounted onto a support whether the support surface is planar or non-planar.

9. A mounting assembly according to claim 8 wherein said leg portion is slightly curved in transverse cross section to substantially conform to the surface of the article to be mounted and said base portion being bent at a right angle thereto, and
said base portion having an aperture for receiving a mounting bolt for mounting the bracket to the support surface.

10. A mounting assembly according to claim 9 in which
said upstanding portion aperture has a bushing with a central aperture therein removably installed in said base portion aperture which can be removed when a larger aperture is needed.

* * * * *